US005668684A

United States Patent [19]
Palmer et al.

[11] Patent Number: 5,668,684
[45] Date of Patent: Sep. 16, 1997

[54] ELECTRICAL INTERCONNECT FOR A HEAD/ARM ASSEMBLY OF COMPUTER DISK DRIVES

[75] Inventors: Darrell D. Palmer; A. David Erpelding; Surya Pattanaik, all of San Jose, Calif.

[73] Assignee: International Business Machines Corporation, Armonk, N.Y.

[21] Appl. No.: 692,940

[22] Filed: Aug. 6, 1996

[51] Int. Cl.⁶ .................................. G11B 5/54; G11B 21/16
[52] U.S. Cl. ........................................ 360/106; 360/105
[58] Field of Search ............................. 360/104, 97.01, 360/106, 105, 107

[56] References Cited

U.S. PATENT DOCUMENTS

| | | | |
|---|---|---|---|
| 4,792,875 | 12/1988 | Ohdaira | 360/104 |
| 5,012,368 | 4/1991 | Bosier et al. | 360/104 |
| 5,055,969 | 10/1991 | Putnam | 361/398 |
| 5,074,029 | 12/1991 | Brooks, Jr. et al. | 29/603 |
| 5,095,396 | 3/1992 | Putnam et al. | 360/106 |
| 5,103,359 | 4/1992 | Marazzo | 360/104 |
| 5,121,273 | 6/1992 | Slezak | 360/104 |
| 5,185,683 | 2/1993 | Oberg et al. | 360/104 |
| 5,392,179 | 2/1995 | Sendoda | 360/104 |
| 5,422,764 | 6/1995 | McIlvanie | 360/97.01 |
| 5,535,074 | 7/1996 | Leung | 360/104 |
| 5,550,694 | 8/1996 | Hyde | 360/104 |

FOREIGN PATENT DOCUMENTS

| | | | |
|---|---|---|---|
| 61-198481 | 9/1986 | Japan | 360/104 |
| 4-69803 | 3/1992 | Japan | 360/104 |
| 6-243449 | 9/1994 | Japan | 360/103 |

*Primary Examiner*—John H. Wolff
*Attorney, Agent, or Firm*—Noreen A. Krall; James E. Bradley; Andrew J. Dillon

[57] ABSTRACT

A disk drive has an improved electrical interconnect assembly for coupling one or more conductive paths leading from a read/write head with the conductive terminals of a flexible cable. The improved interconnect assembly includes an interconnect tab with a plurality of interconnect pads attached thereto. The interconnect tab is connected to a suspension assembly containing a planar suspension member which is located and secured on the actuator arm such that the interconnect tab extends beyond the peripheral edge of the actuator arm. The interconnect tab is inclined toward the side of the actuator arm opposite the side on which the suspension assembly is mounted. The end of the inclined interconnect tab extends to a distance from the planar suspension member approximately equal to half the thickness of the actuator arm. The flexible conductive cable has conductive paths connected to an array of terminals which is oriented at an incline wherein each terminal is aligned with a corresponding interconnect pad. Each flexible cable terminal and corresponding interconnect pad defines an L-shaped joint that is electrically coupled by an electrically conductive fillet, thereby electrically interconnecting the read/write head to the flexible conductive cable. More than one suspension assembly utilizing this improved electrical interconnect assembly can be secured to a single actuator arm and multiple actuator arms can be used in a single disk drive. The interconnect assembly allows the disks to be spaced closer together by better utilization of the vertical space occupied by the actuator arms and disks.

11 Claims, 3 Drawing Sheets

Fig. 3

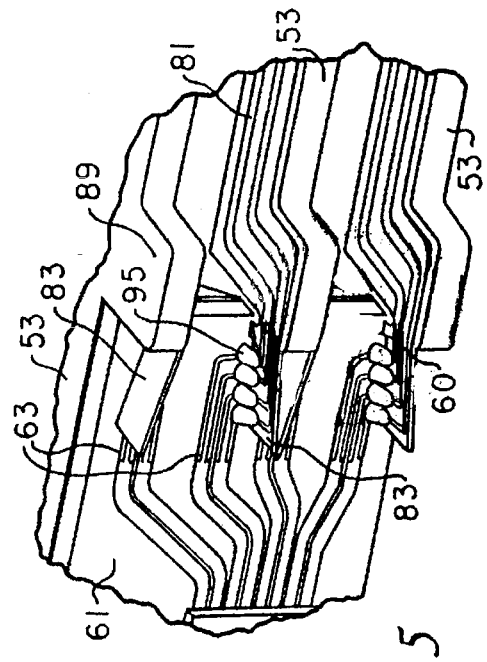
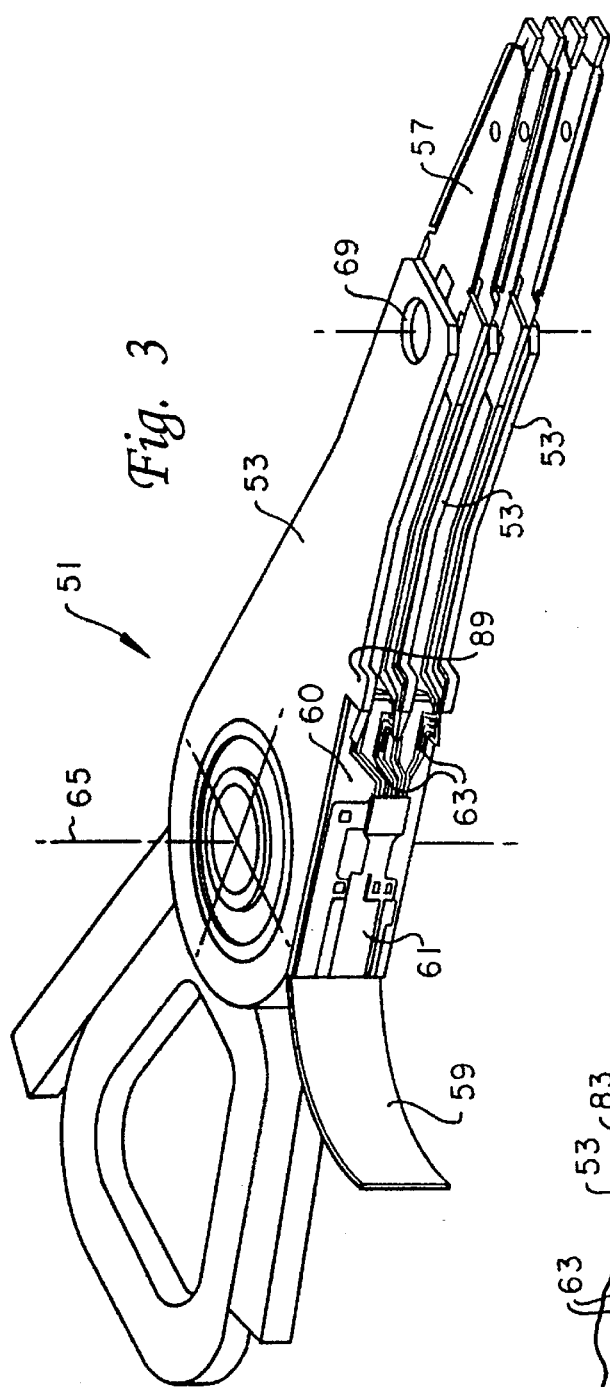
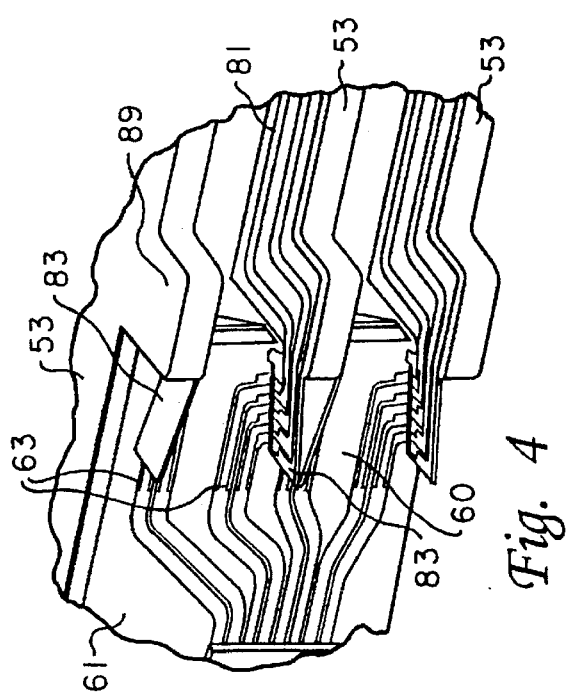

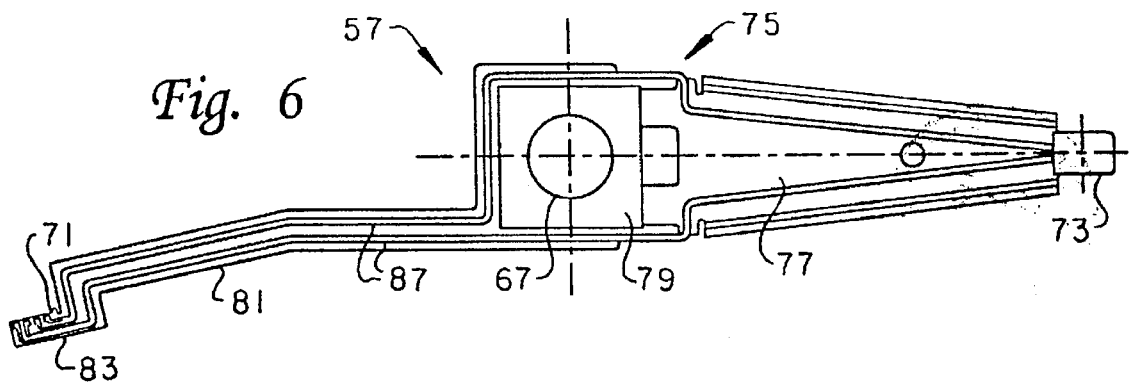
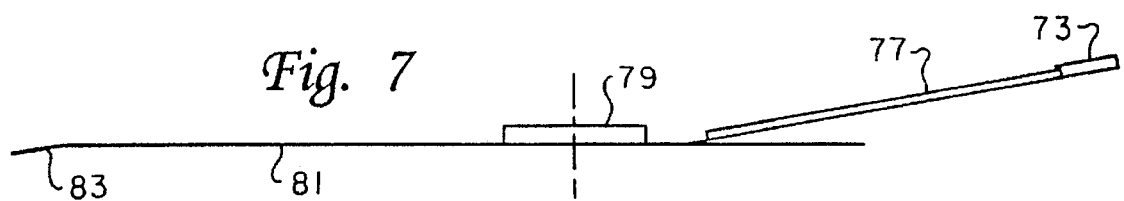
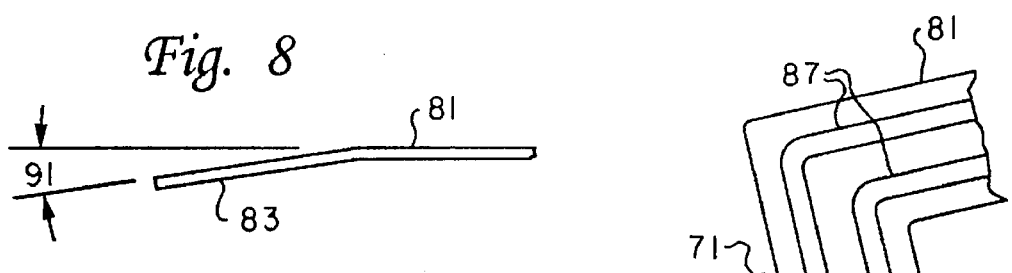
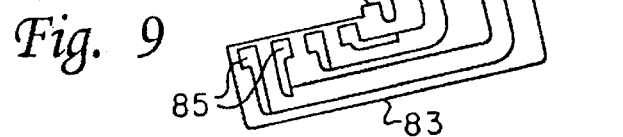
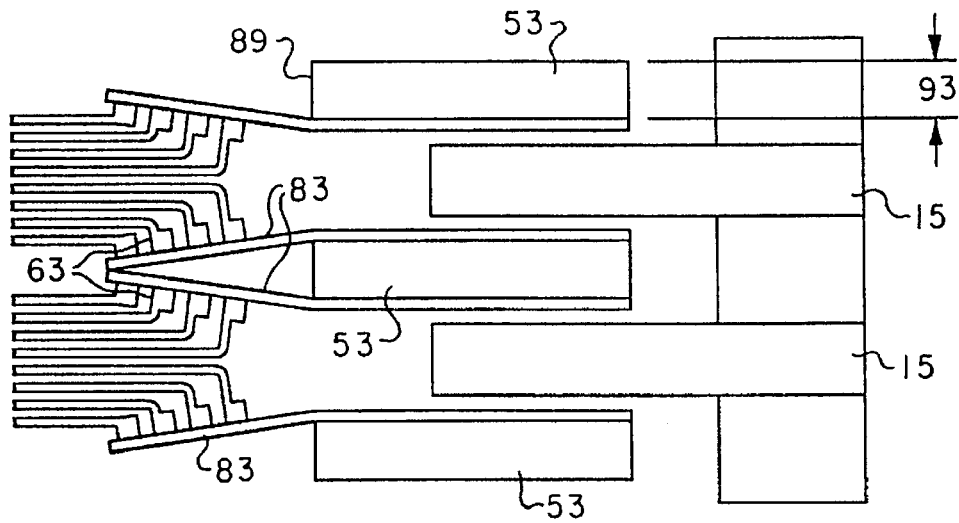

ELECTRICAL INTERCONNECT FOR A HEAD/ARM ASSEMBLY OF COMPUTER DISK DRIVES

BACKGROUND OF THE INVENTION

1. Field of the Invention

The present invention relates generally to computer memory storage systems and, more particularly, magnetic data read/write apparatus for computer hard disk storage.

2. Description of the Prior Art

Conventional computer disk drives are the primary form of data storage devices used today. Disk drives have one or more actuator arms which are movable relative to one or more corresponding rotatable magnetic disks mounted on a spindle. The movable actuator arm supports a suspension assembly that extends across the disk to position a magnetic head radially over concentric tracks in the disk for reading and writing of information. This information is then electronically conveyed between the head and external circuitry. This invention relates to the problem associated with electrically interconnecting the magnetic head with electronic circuitry located external to the actuator arm and suspension assembly.

The simplest interconnecting technique is to hand solder each conductive lead on the suspension assembly to a flexible circuit or connective cable. Because of the very small dimensions of the heads and the conductive leads leading from them, this method is extremely labor intensive. Also, hand soldering results in increased manufacturing costs because of problems with the solder connections and damaged connections due to operator handling.

Automated methods of interconnecting can increase the reliability, but are still subject to similar problems. The most common method requires that the leads have free ends or flying leads that are positioned, either manually or otherwise, away from the conducting surface and over contact pads on the flexible circuit or cable, whereupon solder is applied automatically to bond the lead ends to the flexible circuit. Another variation requires that these flying leads be connected to conducting paths at an intermediate section of the actuator arm and then these paths terminate in a manner suitable for more rugged electrical connections. This variation still leaves a service loop with no support that can be easily damaged. Indeed, any method utilizing a flying lead type of solder connection can be easily damaged during the manufacturing process or while being handled because the flying lead connection does not have any support.

U.S. Pat. No. 5,422,764 to McIlvanie suggests an automated method of interconnecting the magnetic head to a flexible circuit that avoids the difficulties associated with flying leads. This method suggests guiding tabs from the actuator arm through slots in a flexible connector in an L-shaped configuration. Then automation is used to solder conductive paths leading to the end of the actuator arm tabs to conductive paths leading to the edge of each of the connector slots.

Although McIlvanie avoids the vulnerabilities of flying leads, the interconnection takes up valuable space in the disk drive. As disk drive technology has become more advanced, it has become extremely important to utilize every bit of available space, even down to a scale of millimeters and smaller. In McIlvanie's method, the space occupied by the thickness of the actuator arm and the height of the flexible connector is wasted space between the disks in the disk drive because both the arm and the connector obstruct access to this space.

SUMMARY OF THE INVENTION

The present invention provides an improved interconnect apparatus for electrically connecting a magnetic head to external electronic circuitry for transferring the read/write information of a magnetic recording system. The most common type of magnetic recording system is a disk drive that has at least one storage disk and at least one actuator arm movable relative to the storage disk. The actuator arm supports a suspension assembly and radially positions a read/write head connected to the suspension assembly. The read/write head then electronically transfers data to and from an external circuit.

In one embodiment of the present invention, the suspension assembly comprises a planar suspension member supporting the read/write head, a leg supporting an interconnect tab with interconnect pads, and a plurality of conductive paths leading from the read/write head to the corresponding interconnect pads. The read/write head is located at one end of the planar suspension member and the interconnect pads are located at the opposite end. The suspension assembly is secured to an actuator arm which has an arm extension. When properly located and secured, the interconnect tab extends beyond the arm extension. The interconnect tab is then bent toward the side of the actuator arm opposite the side on which the suspension assembly is secured. When fully bent, the end of the interconnect tab is spaced a distance from the plane of the suspension member approximately equal to half the thickness of the actuator arm. The interconnect pads on the interconnect tab are aligned such that they face inward and terminate near the actuator arm when the suspension assembly is secured. Next, a flexible conductive cable is mounted to the actuator such that its terminals form an array that aligns with the interconnect pads of the suspension assembly. Finally, right angle solder fillets are used to interconnect each of the interconnect pads to its corresponding cable terminal.

Each actuator arm generally secures two suspension assemblies, one on its top side and one on its bottom side. The suspension assemblies are oriented such that the interconnect pads on both are located on the same side of the actuator arm and all of the pads are connected to corresponding terminals of the flexible conductive cable. In addition, multiple actuator arms are often connected to a single actuator for a single disk drive.

BRIEF DESCRIPTION OF THE DRAWINGS

FIG. 3 is a perspective view of an actuator with multiple actuator arms supporting suspension assemblies of the present invention interconnected to a flexible conductive cable.

FIG. 4 is an enlarged, partial perspective view showing the suspension assembly secured on the actuator illustrated in FIG. 3 wherein the interconnect pads are aligned with the flexible cable terminals before soldering.

FIG. 5 is an enlarged, partial perspective view showing the suspension assembly secured on the actuator illustrated in FIG. 3 wherein the interconnect pads are connected to the flexible cable terminals after soldering.

FIG. 6 is a top plan view of the suspension assembly of the present invention.

FIG. 7 is a side elevational view of the suspension assembly of FIG. 6.

FIG. 8 is an enlarged, partial side elevational view of the inclined interconnect tab illustrated in FIG. 6.

FIG. 9 is an enlarged, partial top plan view of the interconnect tab illustrated in FIG. 6.

FIG. 10 is an enlarged, partial schematic of a computer disk drive utilizing the present invention.

DETAILED DESCRIPTION OF PREFERRED EMBODIMENT

Figure 1:
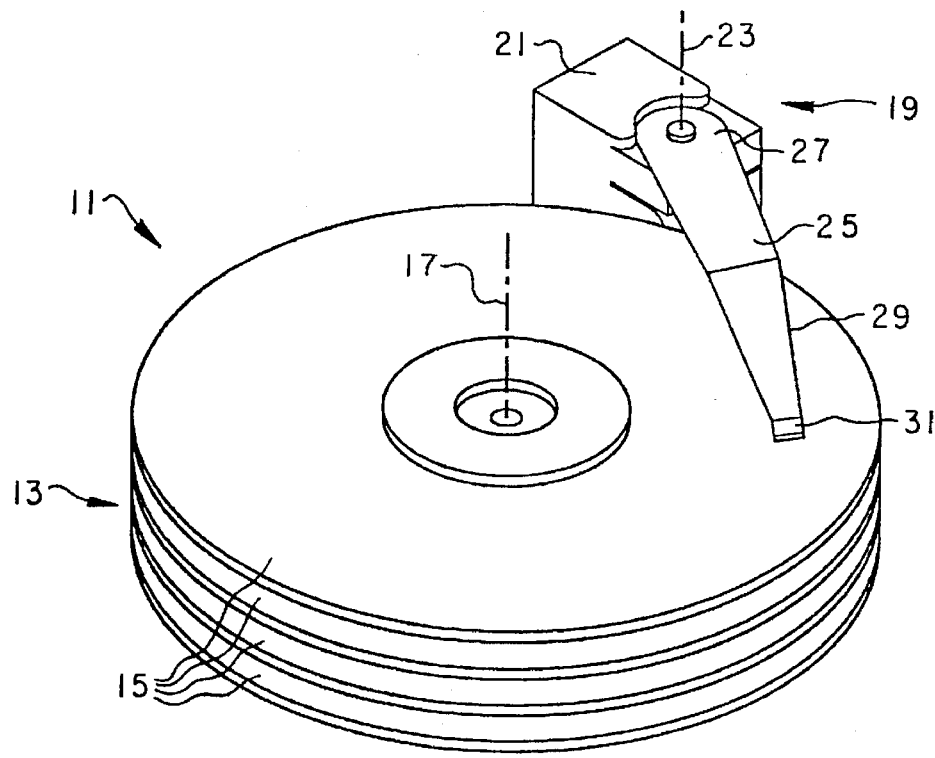
FIG. 1 is a perspective view of a prior art computer disk drive.

The novel features believed characteristic of the invention are set forth in the appended claims. The invention itself, however, as well as a preferred mode of use, further objectives and advantages thereof; will best be understood by reference to the following detailed description of an illustrative embodiment when read in conjunction with the accompanying drawings, wherein:

In FIG. 1, a conventional prior art hard disk memory storage system 11 is shown. As illustrated, the disk drive 11 includes a stacked array 13 of multiple magnetic disks 15 rotating in unison about a central axis of rotation 17. The magnetic disks 15 are supported by a spindle assembly and rotated at a substantially constant speed by a motor or other drive mechanism (not shown). Each of the magnetic disks 15 has many concentric tracks for storing data.

A head/arm assembly 19 is positioned adjacent to the stacked disk array 13. The head/arm assembly 19 includes a fixed housing or frame 21 and multiple actuator arm 25 which are controllably pivoted about an axis 23 relative to frame 21. Only one actuator arm 25 is shown in FIG. 1, but other actuator arms are aligned beneath arm 25 such that one or two arms are provided for each of the magnetic disks 15. The rotatable actuator arms 25 are thereby movable relative to the disks 15.

In the prior art disk drive of FIG. 1, actuator arm 25 has a proximal end 27 coupled to frame 21 and a distal end 29 supporting a head gimbal assembly 31. The head gimbal assembly 31 includes a slider and a magnetic read/write head mounted on the slider. The read/write head transfers data to and from disk 15. According to this arrangement, actuator arm 25 supports and radially positions the read/write head above the desired concentric tracks of disk 15 as actuator arm 25 is controllably rotated about axis 23.

Figure 2:
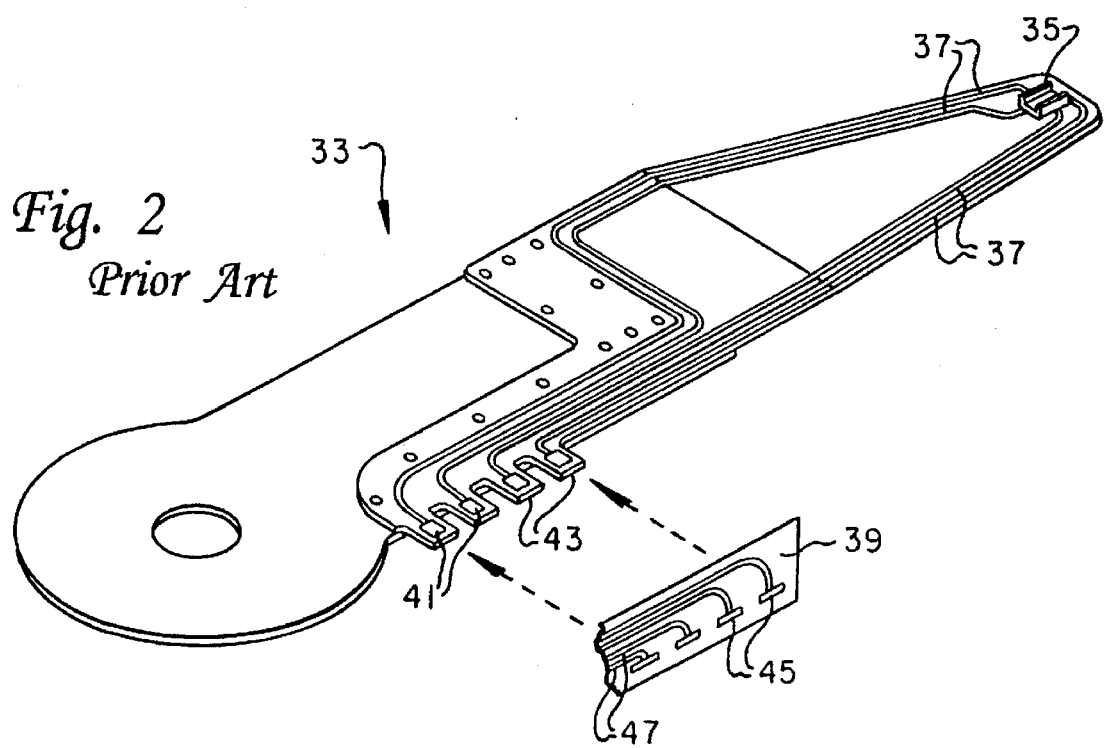
FIG. 2 is an exploded perspective view of a prior art read/write head, suspension assembly, and actuator arm being interconnected to a flexible connector.

FIG. 2 illustrates a prior art actuator arm 33 as disclosed in U.S. Pat. No. 5,422,764 to McIlvanie. Extending from the read/write head 35 are a plurality of conductive paths 37. Each of the conductive paths 37 terminates in an interconnect pad 41 attached to an interconnect tab 43. The tabs 43 are then fitted through corresponding slots 45 in the flexible connector 39. Additional conductive paths 47 lead from the slots 45 in the flexible connector 39 to some other external location. Finally, these conductive paths 47 are right angle soldered to the interconnect pads 41 to complete the interconnect.

The prior art interconnect apparatus of FIG. 2 effectively avoids most assembling and handling damages associated with flying leads by providing support for the conductive paths at all points, but the apparatus is not space efficient. The thickness of the actuator arm and the height of the flexible connector obstruct valuable space that could otherwise be used for additional disks and thereby create additional storage capacity.

FIG. 3 shows an E-shaped actuator assembly 51 utilizing the interconnect method of the present invention. Actuator 51 has a body with multiple actuator arms 53, with each actuator arm 53 supporting at least one suspension assembly 57. Actuator arms 53 are flat, parallel members spaced apart from each other. A flexible conductive cable 59 coupled to a printed circuit board 61 is physically connected to a side wall 60 of the actuator 51. The interconnect method of this invention is used to physically and electrically interconnect conductive terminals 63 leading from flexible cable 59 to conductive paths 57 leading from the suspension assembly 57. As in the prior art disk drive of FIG. 1, the entire actuator assembly 51 controllably rotates about a central axis 65.

FIGS. 6 and 7 illustrate the suspension assembly 57 which is secured to the actuator arms 53 of FIG. 3. The suspension assembly 57 is positioned horizontally by securing it to one side of an actuator arm 53. Then it is located axially on the actuator arm 53 by aligning the suspension mounting hole 67 to the actuator arm mounting hole 69 as shown in FIG. 3. Finally, a location nub 71 shown in FIGS. 6 and 9 angularly aligns the suspension assembly 57 by abutting against the printed circuit board 61 coupled to the flexible cable 59. It should be noted that this technique is cited only as an example of how alignment can be accomplished and that the current invention is not limited to this technique alone. Other methods of alignment generally known in the art may also be used. Once the suspension assembly 57 is properly aligned, the slider containing the read/write head 73 can be properly positioned by the actuator assembly 51 over the tracks of the magnetic disks 15.

Still referring to FIGS. 6 and 7, suspension assembly 57 comprises a slider containing a read/write head 73, a planar suspension member 75, a suspension leg 81, and an interconnect tab 83. The slider containing the read/write head 73 is mounted to the planar suspension member 75, which comprises a head gimbal assembly 77 and a rigid mounting plate 79. Extending from the planar suspension member 75 in a direction away from the read/write head 73 is the leg 81 which supports the interconnect tab 83. As shown in FIG. 9, a plurality of interconnect pads 85 are attached to the interconnect tab 83. Electrically conductive paths 87 are connected from leads of the read/write head 73 to the interconnect pads 85.

As shown in FIGS. 3, 4, and 5, each actuator arm 53 has a tab or arm extension 89 extending beyond its peripheral edge a short distance. When suspension assembly 57 is positioned on an actuator arm 53, leg 81 of the suspension assembly 57 is supported by the actuator arm 53 and the arm extension 89, but interconnect tab 83 extends beyond the peripheral edge of the arm extension 89. Once the suspension assembly 57 is properly aligned on an actuator arm 53, it is secured to the actuator arm 53 and arm extension 89 by epoxy bonding, swaging, or some other comparable method.

As illustrated in FIGS. 4, 5, and 10, the interconnect tab 83 is then bent or inclined toward the side of the arm extension 89 opposite the side on which the suspension assembly 57 is mounted. For example, if the apparatus is oriented such that the suspension assembly 57 is mounted horizontally on the bottom side of the actuator arm 53, then the interconnect tab 83 should be bent upward toward the top side of the actuator arm 53. The angle of inclination 91 of the interconnect tab 83 shown in FIG. 8 should be selected such that the interconnect tab 83 ends at a position approximately midway through the thickness 93 of the actuator arm 53. In other words, the end of the interconnect tab 83 should extend from the plane of the suspension member a distance approximately equal to half the thickness 93 of the actuator arm 53.

This bending of the interconnect tab is shown in FIG. 10 wherein the middle actuator arm 53 has two suspension assemblies 57, one on its top side and one on its bottom side. The interconnect tabs 83 of each are bent toward each other. With each end extending approximately half the thickness 93 of the middle actuator arm 53, the two interconnect tabs 83 almost touch each other. In fact, the interconnect tabs 83 can actually contact each other without shorting because they are insulated from conductive pads 85.

Once an interconnect tab 83 is inclined, its interconnect pads 85 are positioned in an array that is also inclined at the same angle of inclination 91. The terminals 63 leading from the flexible cable 59 must align with the interconnect pads 85 of the suspension assembly 57 to make a proper interconnection. As a result, these terminals 63 must form an array that is inclined at the same angle of inclination 91 as the interconnect tab 83 as demonstrated in FIG. 10. Terminals 63 are secured to side wall 60 of the body of actuator 51.

FIG. 4 illustrates the assembly stage just before the suspension interconnect pads 85 are terminated to the flex cable terminals 63. At this stage the suspension assembly 57 is properly located and secured on an actuator arm 53 such that each of the interconnect pads 85 align with a corresponding terminal 63 connected to a flex cable 59. Once this stage is reached, termination can be accomplished by any one of several automated processes generally known in the art. For example: 1) right angle solder fillets formed by laser reflow as described in U.S. Pat. No. 5,530,604, entitled "Electrical Connection and Slider-Suspension Assembly Having an Improved Electrical Connection", issued Jun. 25, 1996, 2) right angle solder fillets formed by solder ball placement and laser reflow as described in U.S. patent application, Docket No. SA9-96-069, Ser. No. 08/670,551 entitled "Head Transducer to Suspension Lead Termination by Solder Ball Place/Reflow", filed Jun. 27, 1996, incorporated herein by reference, 3) hot tip solder reflow with pre-tinned pads, 4) Panasonic soft beam (Xenon lamp) reflow with pre-tinned pads, 5) hot gas reflow with pre-tinned pads, or 6) right angle conductive epoxy fillets. It should be evident to one skilled in the art that the current invention is not limited to the termination processes cited above. Any process for producing an electrically conductive fillet either by the addition of material or by the transformation of existing material may be used. Henceforth, the term "electrically conductive fillet" will be used to refer to all such processes.

As shown in FIGS. 4, 5, and 10, each actuator arm 53 generally has two suspension assemblies 57 mounted on it, one on the top side and one on the bottom side because each magnetic disk 15 can store information on both of its sides. As a result, one read/write head 73 is needed on each side of the disk 15. Accordingly, one suspension assembly 57 is required on each side to support each read/write head 73 and to transfer the electronic data to an external source. Of course, the additional suspension assemblies 57 require additional corresponding terminals 63 leading from the flexible cable 59.

The advantages of the present invention for electrical interconnection include the reliability of making automated connections free of any easily damaged flying leads as used in the prior art combined with significant improvements in utilizing the limited amount of available space in a disk drive. The invention results in increased vertical space for magnetic storage disks. By virtue of the angle of the inclination of the interconnect tabs, the space required in the disk drive for the interconnections is substantially reduced. Essentially, the vertical space occupied by the thickness of each of the actuator arms is used for the interconnect pads and the flexible cable terminals to make their interconnection. As a result, the space wasted by the interconnect apparatus in the prior art is eliminated by completing the interconnect in the vertical space already obstructed by the actuator arm extension. Accordingly, the space required between the disks is reduced by a distance equal to the thickness of each of the actuator arms. This space saving result becomes ever more significant as more disks are used because the invention saves an additional vertical distance equal to the arm thickness every time an additional disk is added.

While the invention has been shown in only some of its forms, it should be apparent to those skilled in the art that it is not so limited but is susceptible to various changes without departing from the scope of the invention.

We claim:

1. An apparatus for reading and writing magnetic data, comprising:

an actuator selectively rotatable about an axis of rotation, having a plurality of substantially flat actuator arms, each located in a plane perpendicular to the axis of rotation;

a plurality of suspension assemblies, each of the suspension assemblies comprising a read/write head, a planar suspension member, an interconnect tab, a plurality of electrically conductive interconnect pads on the interconnect tab, and a plurality of electrically conducting paths extending along the planar suspension member from the read/write head to the interconnect pads;

each planar suspension member having a mounting portion secured to one of the actuator arms, a free end connected to the read/write head, and a leg extending from the mounting portion in a direction away from the corresponding read/write head;

each interconnect tab being attached to the leg of the suspension member, wherein each interconnect tab is inclined at a selected angle of inclination relative to the actuator arm to which the suspension member is mounted;

a conductive cable having a plurality of terminals secured to the actuator, wherein the terminals are aligned in a plurality of arrays, each of the arrays being at the same angle of inclination relative to the actuator arm as one of the interconnect tabs; and each of the terminals in each of the arrays of the conductive cable being connected to one of the corresponding interconnect pads.

2. The apparatus for reading and writing magnetic data according to claim 1, wherein each of the terminals in each of the arrays of the conductive cable is connected to one of the corresponding interconnect pads by a electrically conductive fillet.

3. The apparatus for reading and writing magnetic data according to claim 1, wherein:

each interconnect tab has a free end opposite where the interconnect tab is connected to the leg;

each actuator arm has a substantially uniform thickness; and the selected angle of inclination of each interconnect tab positions the free end of each interconnect tab an axial distance from the planar suspension member substantially equal to half the thickness of the actuator arm.

4. The apparatus for reading and writing magnetic data according to claim 1, wherein:

at least one of the actuator arms has an upper side and a lower side; and one of the suspension assemblies is secured to the upper side of the actuator arm, and another one of the suspension assemblies is secured to the lower side of the actuator arm, wherein the interconnect tabs of each of the suspension assemblies incline toward each other.

5. The apparatus for reading and writing magnetic data according to claim 1, wherein:

at least one of the actuator arms has an upper side and a lower side;

one of the suspension assemblies is secured to the upper side of the actuator arm, and another one of the suspension assemblies is secured to the lower side of the actuator arm, wherein the suspension assemblies secured to each side of the actuator arm have interconnect tabs that incline toward each other; and the conductive cable has a corresponding terminal connected to each one of the corresponding interconnect pads by a electrically conductive fillet.

6. An apparatus for reading and writing magnetic data, comprising:

an actuator selectively rotatable about an axis of rotation, having a plurality of actuator arms, each having at least one mounting surface located in a plane and which terminates in an edge;

a plurality of suspension assemblies, each comprising a read/write head, a planar suspension member, an interconnect tab, a plurality of electrically conductive interconnect pads on the interconnect tab, and a plurality of electrically conductive paths extending along the planar suspension member from the read/write head to the interconnect pads;

each planar suspension member having a mounting portion secured to one of the actuator arms, a free end connected to the read/write head, and a leg extending from the mounting portion in a direction away from the corresponding read/write head;

each interconnect tab being attached to the leg of each suspension member, wherein the portion of each interconnect tab containing the interconnect pads extends from the edge of one of the actuator arms in a plane which intersects the plane of the mounting surface at an acute angle;

a conductive cable having a plurality of terminals secured to the actuator, wherein the terminals are aligned in a plurality of arrays, each array being at the same acute angle formed by the corresponding interconnect tab and the mounting surface; and each one of the terminals of the conductive cable is connected to each one of the corresponding interconnect pads.

7. The apparatus for reading and writing magnetic data according to claim 6, wherein each one of the terminals of the conductive cable is connected to each one of the corresponding interconnect pads by a electrically conductive fillet.

8. The apparatus for reading and writing magnetic data according to claim 6, wherein:

each interconnect tab has a free end opposite where the interconnect tab is connected to the leg;

each actuator arm has a substantially uniform thickness; and the selected angle of inclination of each interconnect tab positions the free end of each interconnect tab an axial distance from the planar suspension member substantially equal to half the thickness of the actuator arm.

9. The apparatus for reading and writing magnetic data according to claim 6, wherein:

at least one of the actuator arms has two of the mounting surfaces, one on the upper side of the actuator arm and the other on the lower side of the actuator arm; and one of the suspension assemblies is secured to the upper side of the actuator arm, and another one of the suspension assemblies is secured to the lower side of the actuator arm, wherein the interconnect tabs of each of the suspension assemblies incline toward each other.

10. The apparatus for reading and writing magnetic data according to claim 6, wherein:

at least one of the actuator arms has an upper side and a lower side;

one of the suspension assemblies is secured to the upper side of the actuator arm, and another one of the suspension assemblies is secured to the lower side of the actuator arm, wherein the suspension assemblies secured to each side of the actuator arm have interconnect tabs that incline toward each other; and the conductive cable has a corresponding terminal connected to each one of the corresponding interconnect pads by a electrically conductive fillet.

11. An apparatus for reading and writing magnetic data, comprising:

an actuator selectively rotatable about an axis of rotation, having an actuator body with a side wall and a plurality of parallel, flat actuator arms extending therefrom in a forward direction;

each of the actuator arms having a substantially uniform thickness, having a rearward facing edge, and having two mounting surfaces located in two substantially parallel planes, one on an upper side of each actuator arm and the other on a lower side of each actuator arm;

a plurality of suspension assemblies, each comprising a read/write head, a planar suspension member, an interconnect tab, a plurality of electrically conductive interconnect pads on the interconnect tab, and a plurality of electrically conductive paths extending along the planar suspension member from the read/write head to the interconnect pads;

one of the suspension assemblies being secured to the upper side of each actuator arm, and another one of the suspension assemblies being secured to the lower side of each actuator arm;

each planar suspension member having a mounting portion secured to one side of one of the actuator arms, a free end connected to the read/write head, and a leg extending from the mounting portion in a direction away from the corresponding read/write head;

each interconnect tab being attached to the leg of each suspension member, wherein the portion of each interconnect tab containing the interconnect pads extends from the rearward edge of one of the actuator arms;

each interconnect tab having a free end opposite where the interconnect tab is connected to the leg;

the portion of each interconnect tab extending from the rearward edge being inclined at a selected angle of inclination relative to the plane of the mounting surface to which the suspension member is mounted, wherein the free end of each interconnect tab is positioned an axial distance from the planar suspension member substantially equal to half the thickness of the actuator arm, and wherein the interconnect tab on the upper side of the actuator arm is inclined toward the lower side of the actuator arm and the interconnect tab on the lower side of the actuator arm is inclined toward the upper side of the actuator arm;

a conductive cable having a plurality of terminals secured to the side wall of the actuator, wherein the terminals are aligned in a plurality of arrays, each of the arrays being at the same angle of inclination relative to the actuator arm as one of the interconnect tabs; and each of the terminals in each of the arrays of the conductive cable being connected to one of the corresponding interconnect pads by a electrically conductive fillet.

* * * * *